(12) United States Patent
Badwe et al.

(10) Patent No.: US 10,344,429 B2
(45) Date of Patent: Jul. 9, 2019

(54) SYSTEMS AND METHODS FOR ADVANCED OPTIMIZATION OF CONTINUOUS DIGESTER OPERATION

(71) Applicant: ABB SCHWEIZ AG, Baden (CH)

(72) Inventors: Abhijit Badwe, Pune (IN); Ramesh Satini, Karimnagar (IN)

(73) Assignee: ABB Schweiz AG, Baden (CH)

( * ) Notice: Subject to any disclaimer, the term of this patent is extended or adjusted under 35 U.S.C. 154(b) by 250 days.

(21) Appl. No.: 15/248,078

(22) Filed: Aug. 26, 2016

(65) Prior Publication Data

US 2016/0362838 A1 Dec. 15, 2016

Related U.S. Application Data

(63) Continuation of application No. PCT/IB2015/051393, filed on Feb. 25, 2015.

(30) Foreign Application Priority Data

Feb. 26, 2014 (IN) .............................. 977/CHE/2014

(51) Int. Cl.
*D21G 9/00* (2006.01)
*G05B 13/04* (2006.01)

(52) U.S. Cl.
CPC ......... *D21G 9/0018* (2013.01); *G05B 13/041* (2013.01); *G05B 13/048* (2013.01)

(58) Field of Classification Search
None
See application file for complete search history.

(56) References Cited

U.S. PATENT DOCUMENTS

2002/0038197 A1* 3/2002 Chen ................... D21G 9/0009
    702/182
2005/0034824 A1* 2/2005 Lampela .................. D21C 7/12
    162/49

(Continued)

FOREIGN PATENT DOCUMENTS

EP 0919889 A1 6/1999
WO 2010092429 A1 8/2010

OTHER PUBLICATIONS

Padhiyar, et al., Nonlinear inferential multi-rate control of Kappa number at multiple locations in a continuous pulp digester, Journal of Process Control, 16, 10, 2006, 1037-1053. (Year: 2006).*

(Continued)

*Primary Examiner* — Jill A Warden
*Assistant Examiner* — Matthew D Krcha
(74) *Attorney, Agent, or Firm* — Barnes & Thornburg LLP (57) ABSTRACT

A system and method for optimization of a continuous digester operation of a continuous digester are presented. The system includes a tracking module for tracking of process variables in the continuous digester operation and developing non-linear empirical model for one or more quality variables. A soft sensor module is used for deploying a soft sensor based on the non-linear empirical model and for generating soft measurements corresponding to the quality variables at different locations. A constraint management module is used for generating dynamically a set of constraints that are used by a model predictive controller for computing set points for optimization of continuous digester operation.

10 Claims, 6 Drawing Sheets

(56) References Cited

U.S. PATENT DOCUMENTS

2010/0243564 A1      9/2010   Prasad et al.
2012/0048492 A1*   3/2012   Bhat ........................ D21C 7/00
                                                                              162/17

OTHER PUBLICATIONS

International Preliminary Report on Patentability, International Application No. PCT/IB2015/051393, dated Aug. 30, 2016, 7 pages.
European Patent Office, International Search Report for PCT/IB2015/051393, dated May 13, 2015, 3 pages.
European Patent Office, Written Opinion of the International Searching Authority for PCT/IB2015/051393, dated May 13, 2015, 6 pages.

* cited by examiner

SYSTEMS AND METHODS FOR ADVANCED OPTIMIZATION OF CONTINUOUS DIGESTER OPERATION

CROSS-REFERENCE TO RELATED APPLICATIONS

This application is a continuation of International Application No. PCT/M2015/051393, filed Feb. 25, 2015, which claims priority to Indian Patent Application No. 977/CHE/2014, filed Feb. 26, 2014.

FIELD OF THE INVENTION

This invention relates to pulp mills in general and relates to continuous digesters in particular and provides an advanced optimization technique for continuous digester operation.

BACKGROUND

Figure 1:
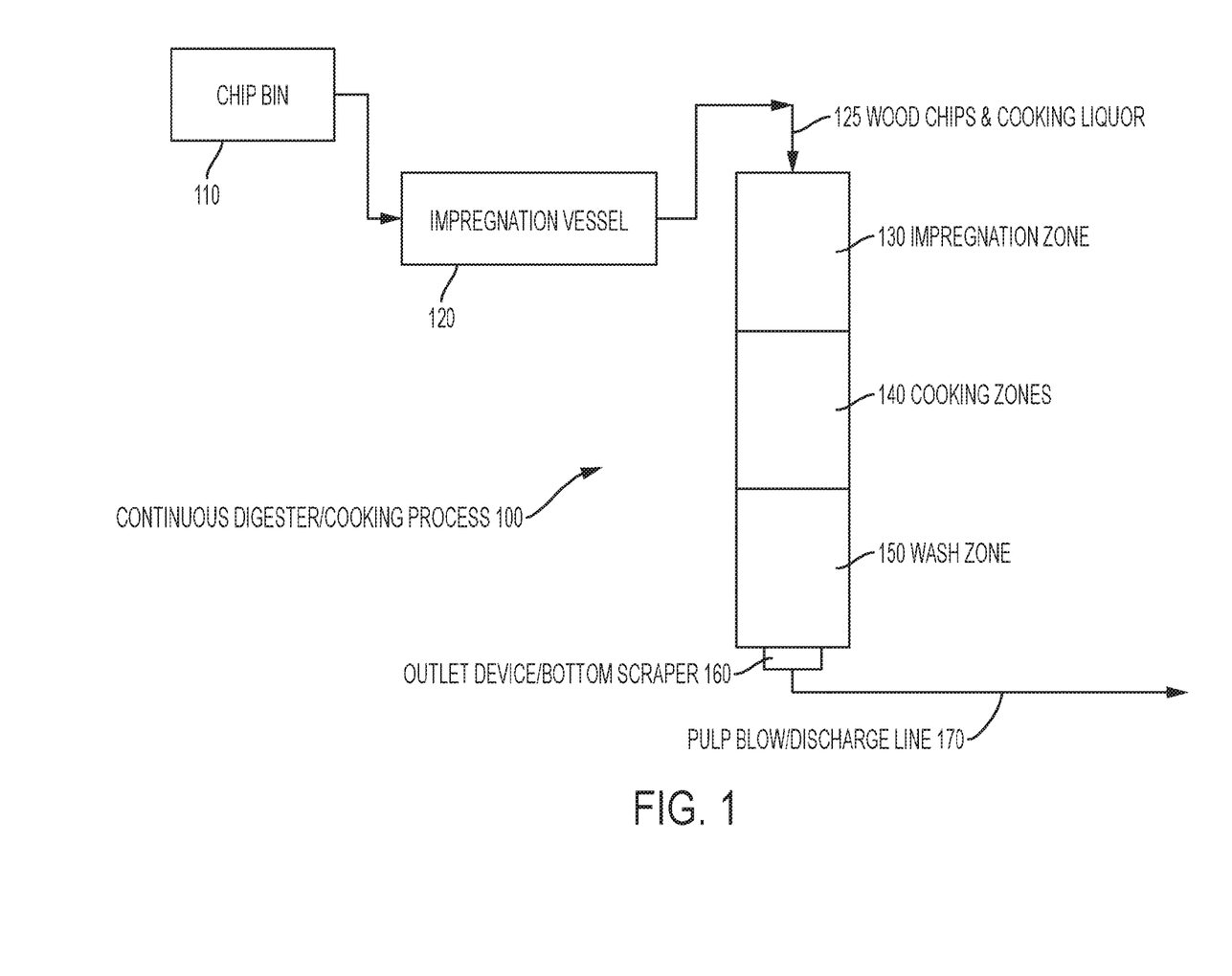
FIG. 1 is a diagrammatic representation for a continuous digester operation.

Continuous Digester is a tubular reactor in which wood chips reacts with an aqueous solution of sodium hydroxide and sodium sulfide, known as White liquor, to remove the lignin content from the cellulose fibers. The product of the digesting process is cellulose fibers, called pulp, which is used to make paper products. Most of the Digesters consist of three basic zones as shown in FIG. 1 in the continuous digester process 100, an impregnation zone 130, one or more cooking zones 140, and a wash zone 150. The white liquor 125 penetrates and diffuses into the wood chips received from the wood chip bin 110 through the impregnation vessel 120, as they flow through the impregnation zone. The white liquor and chips are then heated to reaction temperatures and the lignin is removed as pulp moved down though cooking zone, where the majority of delignification reactions occur. The wash zone is the end of digester where a countercurrent flow of free liquor washes the degraded products from pulp. The wash zone also cools off the pulp that is discharge through the pulp blow/discharge line 170 so as to quench the reaction and reduce the damage to cellulose fibers from continued reaction. Kappa number (Kappa) is a measure of the residual lignin in the pulp and is a direct indicator of pulp quality. Kappa number is defined by Technical Association of the Pulp and Paper Industries (TAPPI) in standard T-236. The known relationship between the Kappa number and lignin content is that the percent lignin in the pulp equals 0.147 times the Kappa number.

Kappa number which is a measure of delignification is usually measured at Blow line either by an On-line Analyzer or measured in a laboratory. The measured Kappa is then used for feedback control which manipulates H-Factor target. H-factor regulates the lower cooking zone temperature for a given production rate, provided the effective alkali to wood ratio is unchanged.

There is a long time delay between the measured Kappa at Blow line and temperature change in lower cooking zone (manipulated variable). Because of the slow process, the existing kappa feedback control cannot correct the fast variations in Kappa number. Therefore, goal of existing kappa feedback control is to take care of the slow variations in wood composition and other cooking conditions, and maintain the Kappa number at its target.

There are several other model-based control methods for maintaining the Kappa number in continuous digesters, in which a physics based model of the continuous digester is used to determine best operating conditions i.e. H factor, alkali wood ration etc. to maintain the Kappa number under specified production conditions. The major limitation with such approaches, however, is that the process models are usually nonlinear and consist of several mathematical equations. Such models require a high level of expertise to calibrate and tune and are often practically infeasible to be implemented by an average process or control engineer, thus rendering such control applications expensive and difficult to maintain. Several of these models are based on first principle kinetic models, hence it has limitations on the practical implementation.

Another important parameter is the chip level in the digester. The chip level is the level of the total contents of the digester at any given time as measured in the top section of the digester. Normally, maintaining a steady chip level of 50-60% results in a stable cooking process in the digester and consequently a consistent Kappa number. Frequent variations in the digester level result in disturbances to the cooking process and hence an inconsistent pulp quality i.e. varying Kappa. A high chip level in the digester results in under-cooking of the pulp and hence results in an increased Kappa i.e. the resulting pulp contents higher lignin content than desired. A low chip level in the digester results in over-cooking of the pulp and yields a pulp containing less lignin content than desired. One way to address the effect of chip level variations on pulp quality or Kappa is to vary the cooking conditions (H Factor or cooking zone temperature) in accordance with the level variations. But such variations in cooking conditions result in a non-optimal and inconsistent operation of the digester. Hence, it is important to control the chip level in the digester.

Conventional methods for chip level control rely on adjusting the speed of the outlet device or bottom scraper of the digester and/or the blow or discharge flow rate. The bottom scraper scrapes/pushes out the pulp from the bottom of the digester. The blow or discharge flow rate is the rate of flow of pulp in the blow or discharge line from the digester. While large variations in scraper speed result in variations in pulp consistency (liquor content in the pulp), variations in blow/discharge flow affect the actual production rate from the digester resulting in variations in downstream processes such as pulp washing. Furthermore, the behavior of the chip level in the digester is nonlinear and may not be controlled efficiently using a linear controller. Thus, to achieve a stable chip level and cooking conditions in the digester while also ensuring stable production rates, it is necessary to employ a multivariable optimal control approach that optimally adjusts all relevant process variables taking into account the multivariable dynamics that exists in the continuous digester process and also addresses the nonlinearity in the dynamics.

Due to the complex nature of delignification process and significant residence times in various zones of the continuous digester, it is difficult to maintain the quality variables in the digester. Furthermore, the Kappa number of pulp produced from digester can only be measured physically in the blow line, i.e. the current measured value of Kappa is the result of past process input parameters. Any control based on such a measurement would result in a "reactive" action i.e. the controller would act only after the effect of the current process conditions has been realized at the outlet. Hence, in order to maintain a steady process with minimum variation in the quality of pulp, it is necessary to get an assessment of the Kappa in the cooking zone itself so that any deviation of this cooking zone Kappa can then be immediately addressed by optimally varying the input variables and by also considering the effect that would be seen at the outlet i.e. the blow line.

Therefore, there is a need for a system that considers the nonlinear multivariable effects in the continuous cooking process, predicts quality variables at such locations in the digester where measurements do not exist and then optimally control such variables by varying the input variables in an optimal fashion such that chemical losses are also minimized. The principal object of the invention is therefore to meet the above need by a method and system for inferential predictive optimal control of a continuous digester.

SUMMARY OF THE INVENTION

According to one aspect of the invention, a system for optimization of a continuous digester operation of a continuous digester is provided. The system includes a tracking module for tracking the process variables in the continuous digester operation and for transforming these process variables into transformed variables, and then using the transformed variables to develop non-linear empirical model for one or more quality variables. A soft sensor module is used for deploying a soft sensor based on the non-linear empirical model and for generating soft measurements from the soft sensor corresponding to the quality variables at different locations of the continuous digester operation. A constraint management module is used for generating dynamically a set of constraints based on operating parameters. A controller such as a model predictive controller or any other type of controller is used for computing a plurality of set points within a set of constraints for optimization of continuous digester operation by using the soft measurements and one or more physical measurements. An operator display module is provided to display one or more of the continuous digester operation, the plurality of set points, the set of constraints, the soft measurements, the non-linear empirical model, the transformed variables, the plurality of process variables, and to receive operator inputs.

A method for optimizing a continuous digester operation is provided in another aspect of the invention. The method includes steps for tracking of process variables in the continuous digester operation; transforming the process variables into transformed variables; developing non-linear empirical model using the transformed variables for one or more quality variables; deploying a soft sensor based on the non-linear empirical model; generating soft measurements of for the one or more quality variables at different locations using the soft sensor; generating dynamically a set of constraints based on operating parameters; and optimizing the continuous digester operation by using the soft measurements and physical measurements and computing set points within the set of constraints to optimize the continuous digester operation.

BRIEF DESCRIPTION OF THE DRAWINGS

These and other features, aspects, and advantages of the present invention will become better understood when the following detailed description is read with reference to the accompanying drawings in which like reference numerals represent corresponding parts throughout the drawings, wherein.

DETAILED DESCRIPTION OF THE INVENTION

As used herein and in the claims, the singular forms "a," "an," and "the" include the plural reference unless the context clearly indicates otherwise.

The system and method for optimizing the continuous digester operation for pulp manufacturing as described herein serve as an alternative to using nonlinear control techniques based on first principle models, thereby considerably reducing the cost of implementation (the cost of developing, implementing and maintaining a first principle model is very high given the expertise required). The system and method of the invention generate optimized set points for a variety of controlled variables that represent operating conditions in the continuous digestion process. This allows for improvement in the control of quality variables in the continuous cooking process, optimized use of chemicals and stabilized cooking process of the continuous digester.

Figure 2:
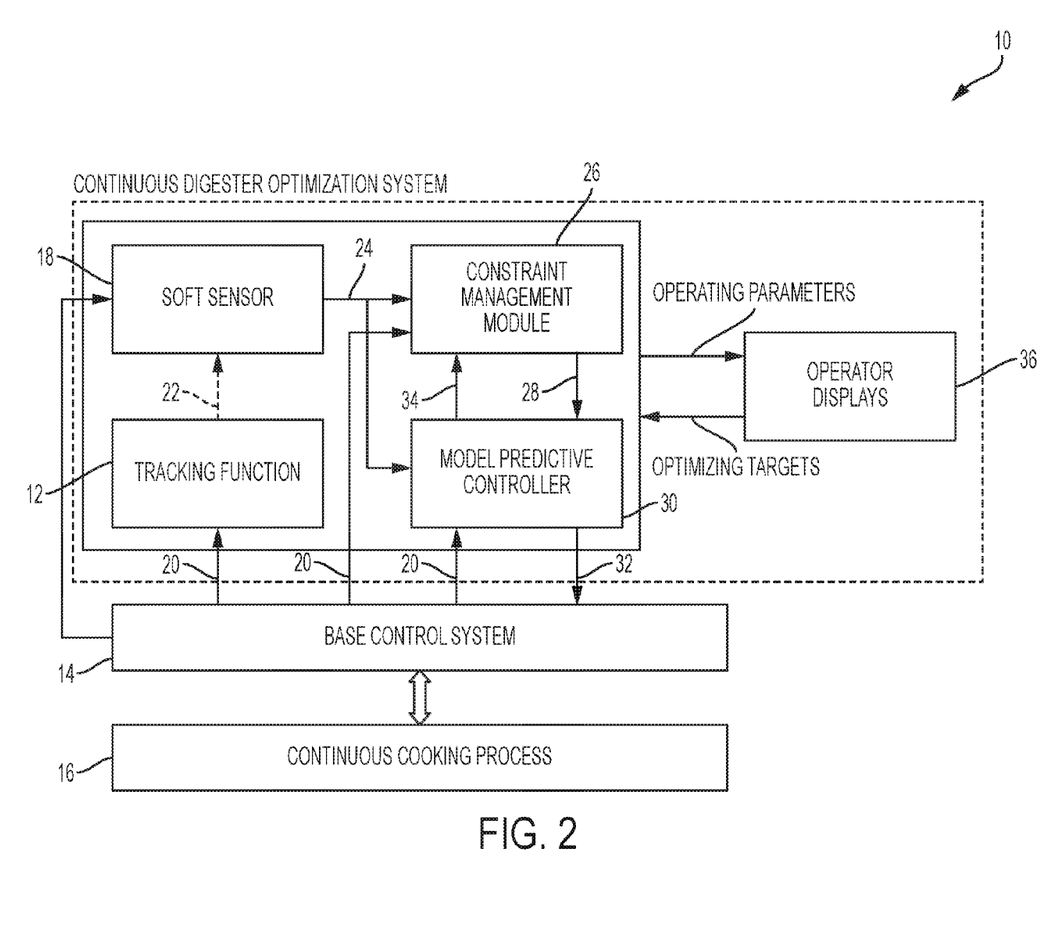
FIG. 2 is a diagrammatic representation for a system for optimization of the continuous digester operation according to one aspect of the invention.

The system 10 for optimization of a continuous digester operation of a continuous digester is shown in FIG. 2 and includes a tracking module 12 for implementing a tracking function for tracking process variables (e.g. chip bin temperature, feed alkali dosage, moisture content in chips etc.) in the continuous digester operation and for transforming these process variables into transformed variables 22. It may be noted here that the tracking module accepts plurality of process variables measured at any location in the continuous digester process and tracks them spatially and dynamically to any desired location downstream of the measurement location. The transformed variables include the dynamic and spatial characteristics of the process variables for inferential modeling and use in the soft sensor for online estimation of various quality variables such as Kappa number, residual alkali, etc. Thus the transformed variables are used to develop non-linear empirical models for one or more quality variables. In an exemplary implementation, the tracking module, usually implemented in a base control system or DCS (Distributed Control System) 14, accepts various process measurements 20 upstream of the cooking process shown by block 16 and tracks them through the various sections of the digester upto the blow line. These tracked variables are used to develop non-linear empirical models of various quality variables.

Figure 3:
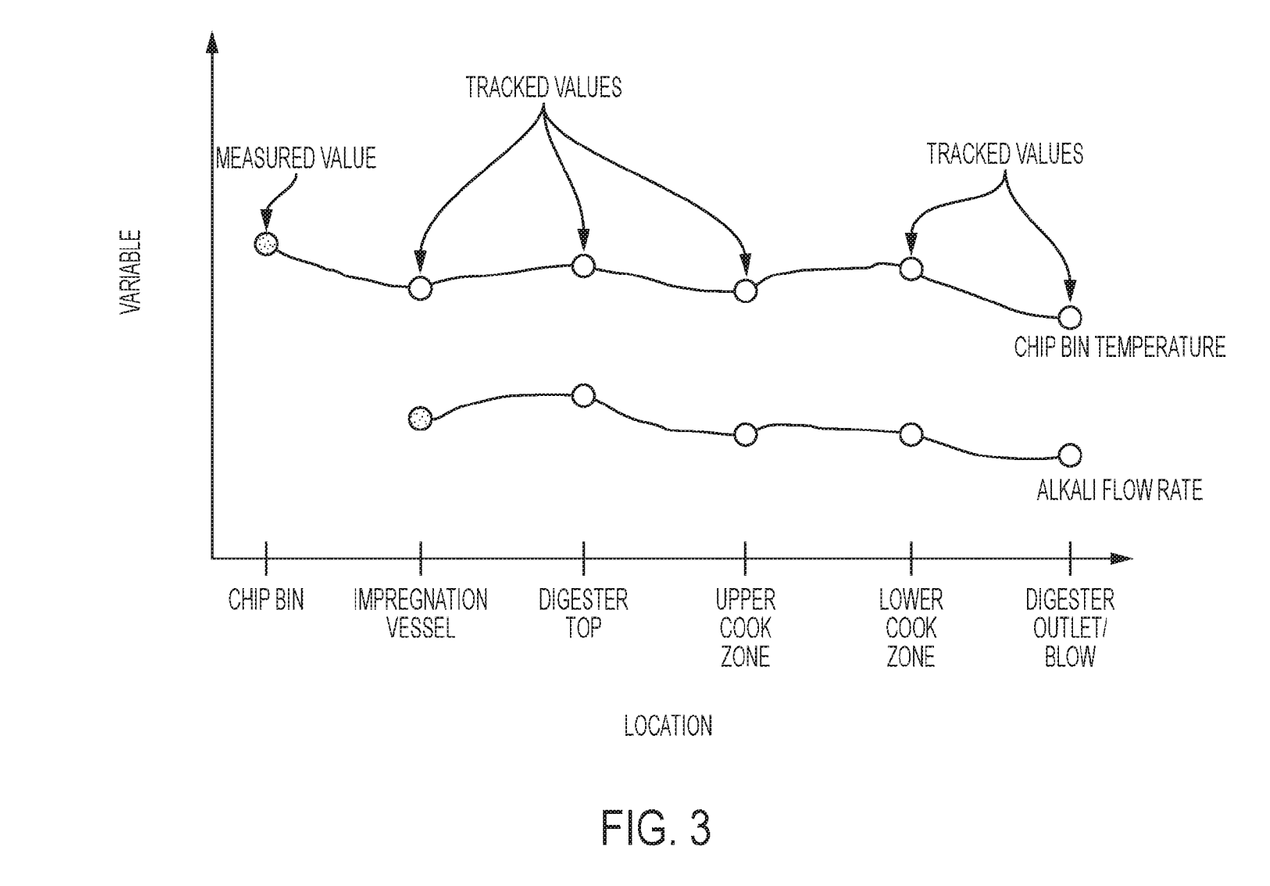
FIG. 3 illustrates the working of the tracking module according to the current invention.

FIG. 3 illustrates an exemplary case of measurement and tracking of process/quality variable chip bin temperature and alkali flow rate. FIG. 3 show chip bin temperature measured at chip bin location and tracked in other locations and also the alkali flow rate measured at impregnation vessel and tracked at other locations.

These models are then used to construct a soft sensor that is deployed online through the soft sensor module 18. The soft sensor module accepts the transformed process variables from the tracking module and uses a variety of nonlinear static data-based models to estimate the quality variables at the various locations in the continuous digester, and yields real time "soft" measurements 24 of the quality variables at different locations. The soft sensor works online in real time and is capable of generating measurements of quality variables at a faster rate and at various locations. The use of tracked variables from the tracking module on allows generation of the complete profile of Kappa through the various zones of the continuous digester. This allows demonstration (via graphical interfaces) of the evolution of the Kappa through the digester, which serves as useful information for the personnel operating the process (referred herein as "operator").

The system 10 includes a constraint management module (CMM) 26 for generating dynamically (in real time) a set of constraints 28 based on different current operating parameters in the cooking process. These constraints are used by an optimizing and controlling engine (OCE), which may include a controller such as the model predictive controller (MPC) 30 at pre-determined sampling intervals. The OCE also uses the soft measurements and one or more physical measurements, and computes a plurality of set points 32 within the set of constraints for optimization of continuous digester operation. The constraint management module computes at each instant a set of constraints for all manipulated variables in the OCE. This dynamic update of constraints allows compensating for the non-linearities in the process and controlling the process using linear models (running in the OCE that provide model predictions 34).

In an exemplary implementation, the constraint management module operates as follows:

As the level in the continuous digester moves out of a certain pre-specified tolerance region around the set point, the CMM starts relaxing the constraints on the manipulated variables such as blow flow, the bottom scraper speed etc. at a pre-specified rate, thereby allowing the OCE to compute optimal set points for the DCS controllers over a wider set.

If the model prediction indicates that the digester level and/or the Kappa number would deviate from its nominal region of operation in the near future (e.g. over the next hour), the CMM begins relaxing the manipulated variable constraints but at a slower rate than that in the situation when the current values of level or Kappa number deviate from their nominal regions.

As the level and/or Kappa number move towards their nominal operating regions, the CMM begins to tighten the constraints dynamically, at a slower rate initially and at a faster rate as they approach very close to their nominal operating points.

The optimizing and controlling engine (OCE) as mentioned herein above, accepts in real time the soft sensor measurements and various other physical measurements and computes optimal set points for several base level controllers in the DCS within the constraining limits computed by the CMM. The OCE optimizes the overall continuous digester operation by tightly maintaining the digester level and blow consistency, resulting in a stable production rate. The OCE also tightly maintains the quality of the pulp by tightly controlling the Kappa while also minimizing the use of alkali, thereby also reducing the alkali losses (residual alkali).

The system 10 also includes an operator display module 36 to display one or more of the continuous digester operation, the plurality of set points, the set of constraints, the soft measurements, the non-linear empirical model, the transformed variables, the plurality of process variables, and to receive operator inputs. Thus the operator display includes outputs from the various modules and OCE of the system 10 that show the overall operation of the system 10, the evolution of Kappa number and other variables through the various zones of the continuous digester and the future predictions of various important parameters of the cooking process.

Figure 4:
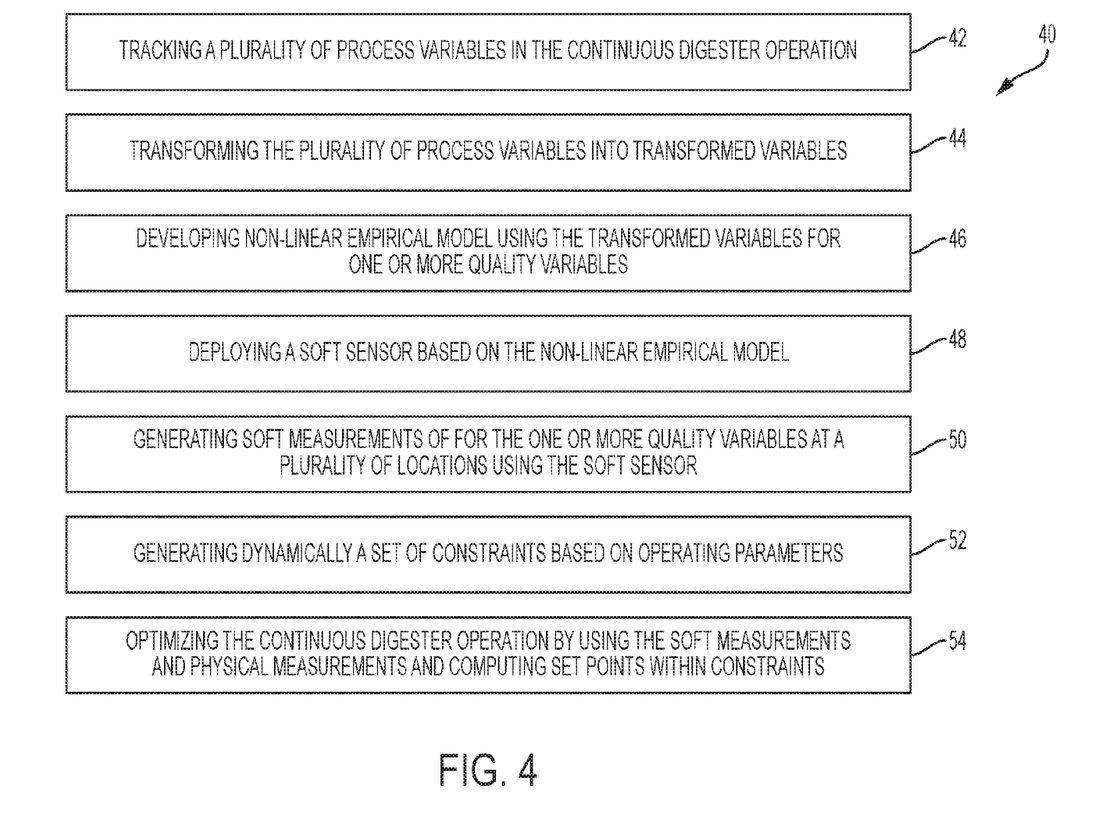
FIG. 4 is a flowchart representation for a method for optimization of the continuous digester operation.

The flowchart 40 for a method for optimizing a continuous digester operation as used in the system 10 is described in FIG. 4. The exemplary method includes a step 42 for tracking different process variables in the continuous digester operation, and then at step 44 transforming the process variables into transformed variables. In an exemplary method, mathematical transforming of the process variables measured at various locations in the continuous cooking process is done to spatially track them up to a location of interest within the continuous digester process or operation. (i.e. the selected process variables are transformed spatially by tracking them from their measurement location up to another location within one of zones of the continuous digester or at the outlet of the continuous digester.) The method includes a step 46 for developing non-linear empirical model using the transformed variables to estimate one or more quality variables such as but not limited to the Kappa number in the various zones or locations inside the continuous digester. A variety of nonlinear data-driven mathematical models are used to capture the relationship between the input i.e. process variables and the output i.e. quality variables and a soft sensor is developed for real time estimations of the quality variables as shown at step 48 that provides soft measurements for the quality variables as shown at step 50. The method includes a step 52 for dynamically calculating the working constraints for the optimization, for example for bottom scraper speed and blow/discharge flow, where constraints are calculated based on the current status of the various controlled variables including but not restricted to the Kappa number and the chip level in the continuous digester. The method further includes a step 54 for optimizing the continuous digester operation by using the soft measurements and one or more physical measurements (for example, chip level in the digester and the pulp consistency at the digester outlet) and computing a plurality of set points within the set of constraints to optimize the continuous digester operation. Additional steps for displaying or more of the continuous digester operation, the plurality of set points, the set of constraints, the soft measurements, the non-linear empirical model, the transformed variables, the plurality of process variables, and providing an operator interface for receiving operator inputs are also included in the exemplary method.

An exemplary tracking methodology used in the system 10 and method of flowchart 40 is explained herein. Referring to FIG. 1 and FIG. 3, if x is a process variable measured at a location Li (example chip bin temperature is measured in chip bin location, and alkali flow rate is measured in the impregnation vessel) in the continuous cooking process 100 and it is desired to transform this variable to use it for estimating its effect at location Lo (other locations where measurement is not made but the values are tracked) within the continuous cooking process 100, then the tracking function first calculates a tracking parameter that actually represents the movement of a single wood chip from the chip bin 110 through the chip bin and then through the various zones in the digester, thus making it possible to track the process variable from location Li to location Lo (illustrated in FIG. 3). The steps in the tracking function are provided here for the chip bin 110. The calculations for other zones in the digester vessel are performed in a similar fashion.

Figure 5:
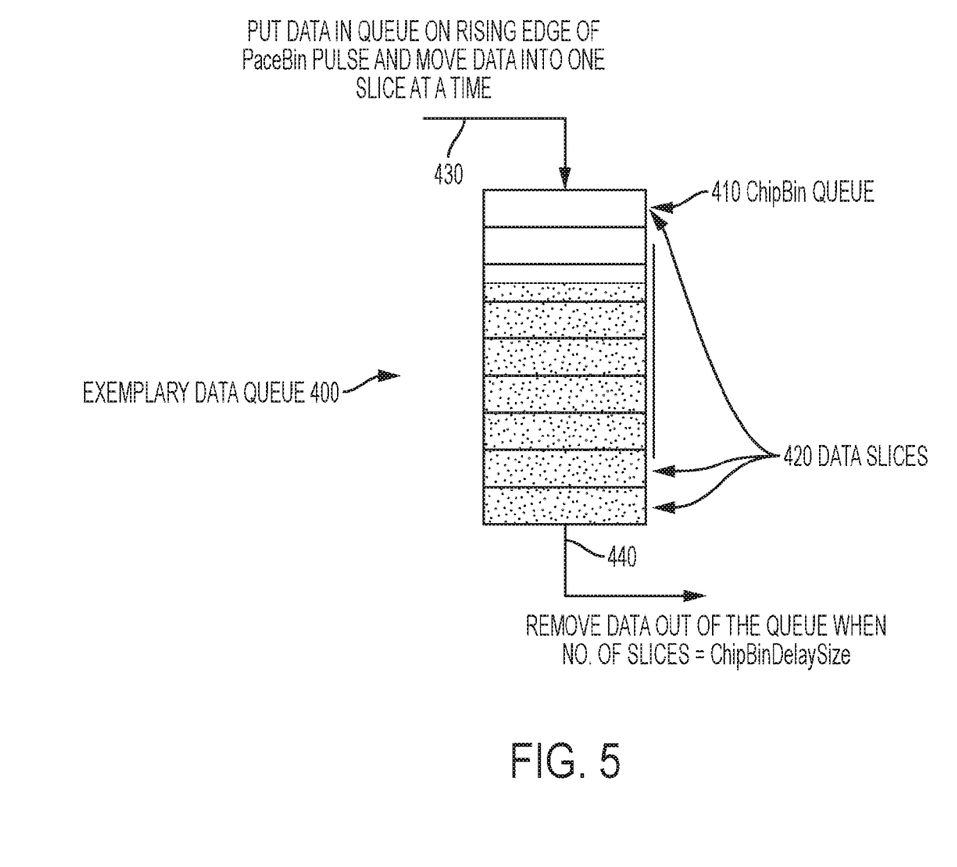
FIG. 5 is a diagrammatic representation for an exemplary technique for tracking process variables.
Figure 6:
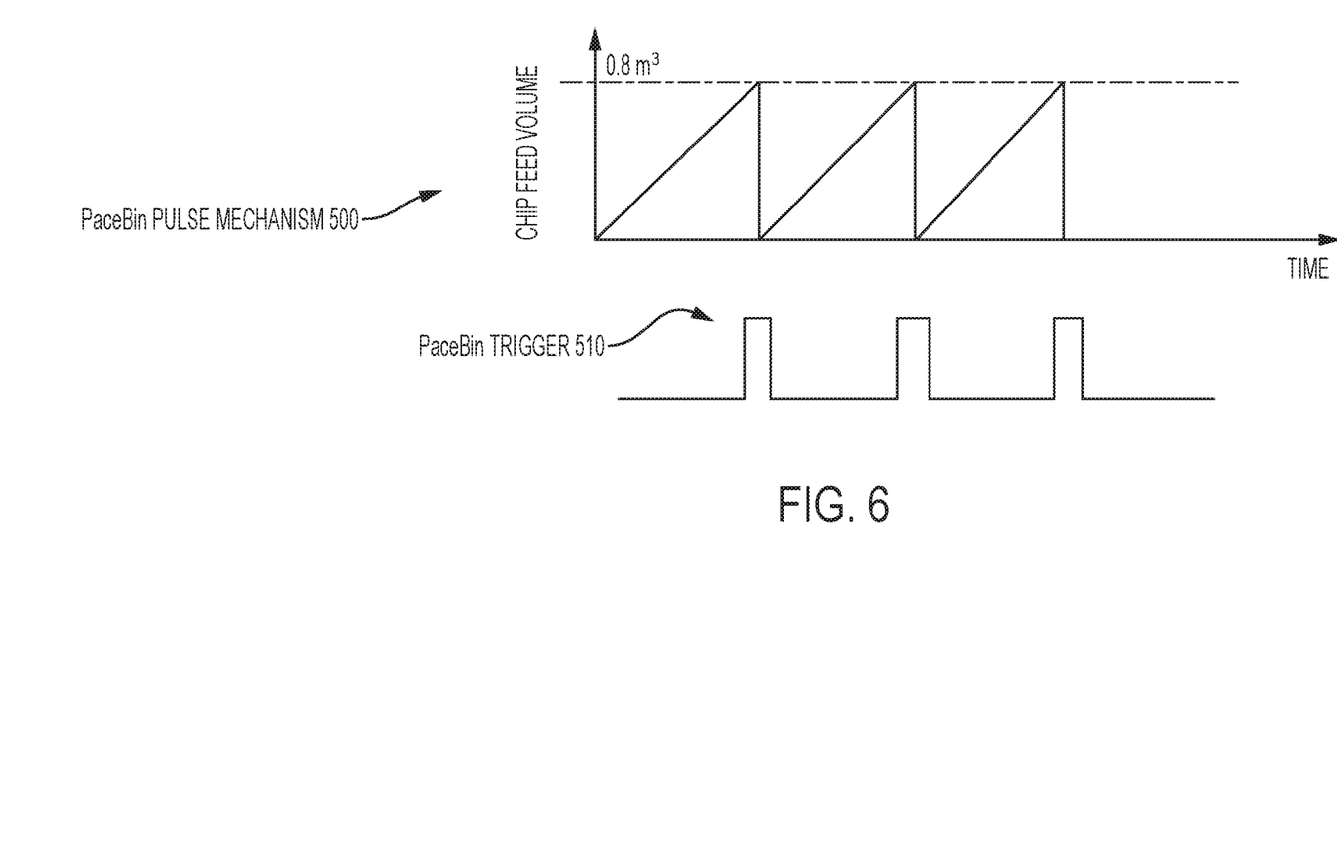
FIG. 6 is a diagrammatic representation for technique for tracking process variables.

Firstly, the chip bin is divided into a number of virtual slices $n_{slices}$. Then, the slice width is calculated as, $$W_{slice} = \frac{\text{Volume of chip bin}}{n_{slices}}$$

where the volume of the chip bin is specified based on the physical dimensions of the chip bin. The values of the process variable to be tracked are then propagated through these data slices 420 in the ChipBin Queue 410 as shown in FIG. 5 based on the retention time in the chip bin. The retention time is based on the size of the zone and the feeding rate of wood chips. The calculation of feeding rate (volumetric rate) of chips is a straightforward calculation, Chip feed volume rate=Feed screw speed×Feeder volume filling degree where, Screw speed is measured value of chip feed screw speed in revolutions per unit time and Feeder volume is a specified parameter and is the amount (volume) of chips supplied per revolution of the screw. This Chip Feed Volume Rate is then integrated to compute the Chip Feed Volume, Chip Feed Volume=∫(Chip Feed Volume Rate)dt A single shot pulse triggers the movement of the data 430 (FIG. 5) into a slice of the Queue i.e. the condition to put data into the queue. For the chip bin example, this is referred as a PaceBin pulse 500 as shown in FIG. 6. A single shot pulse is generated at every slice width ($W_{slice}$), say for example 0.8 m3 of Chip Feed Volume drawn out of the chip bin. This PaceBin trigger signal 510 (FIG. 6) is used to keep the data in the ChipBin Queue 410 (FIG. 5).

Referring again to FIG. 5, the data is pushed out 440 of the Queue when the number of slices equals to the "Chip Bin Delay Size". While in case of other zones in the digester vessel, the delay size is calculated based on the volume of the zone and the production rate, in case of the chip bin the calculation is different because as would be appreciated by one skilled in the art, unlike other zones of the digester, the chip bin is not always 100% full with chips. Therefore, in case of the chip bin, the condition to move the number of slices down to next zone is based on the amount of chip level in the chip bin. Hence, the chip bin level should be calibrated in terms of volume i.e. L % level is equivalent to Lv m3 using a simple linear regression expression. Then the "Chip Bin Delay Size" is given by, $$\text{Chip Bin Delay Size} = \frac{L_v}{W_{Slice}} \text{ (integer value)}$$

The tracked process variables are then transformed and used as inputs to a soft sensor which then estimates specified quality variables. Suppose we wish to use the chip bin temperature $T_{cb}$ in the soft sensor for predicting Kappa in the cooking zone of the digester. Based on trial models of Kappa v/s $T_{cb}$, if it is known that the relationship between Kappa and $T_{cb}$ is nonlinear and the nonlinearity is of the square root type, then we transform the value of chip bin temperature tracked up to the cooking zone, $T_{cb}^{CZ}$ as, $$T_{cb_{transformed}}^{CZ} = \sqrt{T_{cb}^{CZ}}$$

An exemplary soft sensor calculation is shown below for the Kappa number in the cooking zone:

$$\check{K}_{CookingZone} = \mathcal{M}(x_i^{CookZone})$$

where, $\check{K}_{CookingZone}$ is the Kappa number estimate in the cooking zone, $\mathcal{M}$ is the linear or nonlinear soft sensor model and $x_i^{CookZone}$ are transformed process variables affecting Kappa number and tracked from their measurement locations up to the cooking zone. For example, the chip bin temperature (measured in the chip bin) is tracked through the chip bin, the impregnation zone and up to the cooking zone and this tracked value is used in the above soft sensor to get the current estimate of Kappa number in the cooking zone. Similarly, the Kappa number estimated for the cooking zone can be tracked using the tracking function through the cooking zones and the wash zone up to the discharge line. This tracked Kappa value serves as a pulp quality monitoring measure to detect effects of disturbances, grade changes or changes in the wood feed on the Kappa number.

The soft sensor model $\mathcal{M}$ above is determined as a linear or nonlinear representation of the relationship between the cause variables and the quality variable of interest. For example, the soft sensor model for the Kappa number is developed using process variables that affect the Kappa number as inputs and the measured Kappa number. The Kappa number in a continuous digester is usually measured in the blow/discharge line. This measurement may come from an online measuring device or from a laboratory analysis. In order to obtain the relationship $\mathcal{M}$, a regression model (linear or nonlinear) is developed using standard methods between the measured Kappa and the input process variables tracked up to the blow line as, $$K_{BlowLine}^{Measured} = \mathcal{M}(x_i^{BlowLine})$$

where $K_{BlowLine}$, is the Kappa measurement at the blow line obtained from an online measuring device or from laboratory analysis; $x_i^{BlowLine}$ are input process variables tracked up to the blow/discharge line. The relationship $\mathcal{M}$ can be obtained by using standard parameter estimation methods using several observations of the Kappa measurement and the tracked process variables.

Several other quality variables such as the consistency of the pulp in the blow line etc. can be "soft-sensed" using the tracking function and soft sensor.

The Kappa estimate in the cooking zone as described above can be obtained online at specified sampling intervals using a computational device that runs the model $\mathcal{M}$. This cooking zone Kappa estimate is then used as a controlled variable in the optimization system as is maintained at a specified target.

In order to optimally control the continuous digester, a method is disclosed here whereby the Kappa number in the cooking zone is optimally controlled by calculating optimal set points for a number of process variables such as the H Factor, Alkali to Wood Ratio etc. Further, to maintain optimal cooking conditions in the digester, the residual alkali in the circulation flow of the cooking zone is also controlled along with the Kappa number. In the disclosed method, we use an optimizing and controlling scheme that consists of model predictive control (MPC) along with the tracking function and the soft sensor to control the Kappa and other quality variables in the continuous digester.

The MPC computes a sequence of current and future increments for manipulated variables (such as the H factor, Alkali to wood ratio etc.) that minimizes a weighted sum of future squared control errors and a weighted sum of squared increments in the sequence of manipulated variables, while considering the limits/constraints for the manipulated variables and predicted process variables. For those skilled in the art it is known that this MPC objective can be expressed more precisely mathematically as: Compute a sequence of increments for the manipulated variables Δu(k+i) over a control horizon of m samples to minimize the objective function, $$I = \sum_{i=1}^{p} \|\Gamma e(k+i)\|_2^2 + \sum_{i=0}^{m-1} \|\Lambda \Delta u(k+i)\|_2^2$$

Subject to constraints:

$$y_L \leq y(k+i) \leq y_H \ \forall i \in [1,p]$$

$$u_L \leq u(k+i) \leq u_H \ \forall i \in [0,m-1]$$

$$\Delta u_L \leq \Delta u(k+i) \leq \Delta u_H \ \forall i \in [0,m-1]$$

In this minimization the control errors e(k)=r(k)−y(k) and the constraints for process variables are considered over a prediction horizon of p future samples. The constraints for manipulated variables u(k) and their increments are considered over a control horizon of m future samples. In this procedure, the dynamic model is used for the prediction of future values for the process variables. Important design parameters are the weighting matrices Λ and Γ.

In addition to optimally controlling the Kappa and other pulp quality variables in the digester, the disclosed method also controls the chip level in the digester and the consistency of the pulp leaving the digester. In order to achieve this objective, the disclosed method uses an MPC controller that computes optimal set points for the bottom scraper speed and the blow/discharge flow. Additionally, the MPC controller may compute optimal set points for the bottom wash liquor dilution flow. The chip level in the digester and the consistency of the pulp leaving the digester exhibit a non-linear behavior which cannot be efficiently controlled using a linear MPC. In order to address these nonlinear effects and to optimally control the level and the pulp consistency, the disclosed method uses a novel constraint management module. The constraint management module updates the manipulated variable constraints dynamically based on the operating value of the controlled variable. If a process variable, say chip level, to be controlled exhibits nonlinear behavior in a certain range of its operation, then this nonlinearity can be handled by the controller using dynamic manipulated variable constraints i.e. the constraints on the manipulated variable such as blow flow can be updated/changed based on the current value of the chip level. The constraint management module updates the manipulated variable constraints $u_L$ and $u_H$ at each instant based on the range in which the current values of the level and consistency lie. The constraint management module uses a nonlinear function to calculate the new low and high constraints on the manipulated variables. This can be any nonlinear function depending on the type of nonlinearity identified during the design stage for a given process. The manipulated variable constraints at any given instant t are dynamically calculated as shown below:

$$u_L(k) = f_c^L(u_L(k-1), \bar{u}, y(k))$$

$$u_H(k) = f_c^H(u_H(k-1), \bar{u}, y(k))$$

Where $f_c^L$ & $f_c^H$ may be linear or nonlinear functions, $\bar{u}$ is the nominal or base value or range of values for the constraints for the manipulated variable and is a tuning parameter, y(k) is the value of the controlled variable at instant t. An exemplary calculation for the high limit constraint on the blow flow (the pulp flow from the outlet of the digester) as a function of the operating/measured value of the chip level is shown below. Note that in this example, the constraint is dynamically updated using a linear function of the chip level and the nominal range of the high limit constraint.

$$F^H(t) = F_{min}^H + \frac{[L(t) - L_{min}]}{[L_{max} - L_{min}]}[F_{max}^H - F_{min}^H]$$

Where $F^H(t)$ is the high limit constraint on blow flow at a given instant t, $F^H_{min}$ and $F^H_{max}$ are the minimum and maximum values for the blow flow high constraint, $L_{min}$ and $L_{max}$ are the minimum and maximum values for the chip level in a particular range of operation and L(t) is the measured value of chip level at an instant t.

The disclosed method is not restricted to MPC and can make use of any other type of optimizing control.

It would be understood by one skilled in the art that one or more modules as described herein may be also be integrated as functional components and these modules are configured on a computer processor or as integrated chips and known communication protocols may be used for exchange of data between the modules and for communicating with the operation interface.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A system for optimization of a continuous digester operation of a continuous digester, the system comprising one or more processors, wherein the one or more processors comprise:
   a tracking module configured to (i) receive a plurality of process variables relating to corresponding process measurements measured upstream of a cooking process of the continuous digester operation, (ii) track the plurality of process variables to one or more downstream locations, (iii) transform the plurality of process variables into transformed process variables based on dynamic and spatial characteristics of the plurality of process variables, (iv) use the transformed process variables to develop a non-linear empirical model for one or more quality variables, and (v) calculate a tracking parameter indicative of a movement of a single wood chip through a plurality of zones of the continuous digester to track one or more process variables of the plurality of process variables;
   a soft sensor module based on the non-linear empirical model, the soft sensor module configured to generate soft measurements corresponding to the one or more quality variables at a plurality of locations in the continuous digester, wherein the non-linear empirical model is a non-linear representation between transformed process variables at a first location of a zone of the one or more zones of the continuous digester and quality variables at the first location of the zone;
   a constraint management module configured to update dynamically a set of constraints based on a plurality of operating parameters associated with the continuous digester operation, wherein updating the set of constraints comprises updating one or more limits of a constraint of the set of constraints based on a current value of a process variable associated with the constraint; and an optimizing and controlling engine configured to compute a plurality of set points within the set of constraints for optimization of the continuous digester operation as a function of the soft measurements, one or more physical measurements, and the dynamically updated set of constraints, such that the optimizing and controlling engine maintains an optimal digester level and an optimal blow consistency for stable production rate, controls the Kappa number, and minimizes use of alkali for maintaining a pre-defined pulp quality using the plurality of set points.

2. The system of claim 1, wherein the tracking module is further configured to track the plurality of process variables up to a blow line of the continuous digester.

3. The system of claim 1, wherein the one or more quality variables comprise at least one of a Kappa number, residual alkali, and a chip level in the continuous digester.

4. The system of claim 3, wherein the tracking module is further configured to generate a profile for the Kappa number at the plurality of locations of the continuous digester based on transformed process variables.

5. The system of claim 4, wherein the soft sensor module is further configured to generate real time values for the Kappa number at the plurality of locations of the continuous digester based on the profile.

6. The system of claim 1, further comprising an operator display module configured to display one or more of the continuous digester operation, the plurality of set points, the set of constraints, the soft measurements, the non-linear empirical model, the transformed process variables, and the plurality of process variables, and to receive operator inputs.

7. A method for optimizing a continuous digester operation of a continuous digester using one or more processors, the method comprising:
  receiving, with a tracking module of the one or more processors, a plurality of process variables relating to corresponding process measurements measured upstream of a cooking process of the continuous digester operation;
  tracking, with the tracking module, the plurality of process variables in the continuous digester operation to one or more downstream locations;
  calculating, with the tracking module, a tracking parameter indicative of a movement of a single wood chip through a plurality of zones of the continuous digester for tracking one or more process variables of the plurality of process variables;
  transforming, with the tracking module, the plurality of process variables into transformed process variables based on dynamic and spatial characteristics of the plurality of process variables;
  developing, with the tracking module, a non-linear empirical model for one or more quality variables using the transformed process variables, wherein the non-linear empirical model is a non-linear representation between transformed process variables at a first location of a zone of the one or more zones of the continuous digester and quality variables at the first location of the zone;
  deploying a soft sensor module of the one or more processors based on the non-linear empirical model;
  generating soft measurements for the one or more quality variables at a plurality of locations using the soft sensor module;
  updating dynamically, with a constraint management module of the one or more processors, a set of constraints based on a plurality of operating parameters, wherein updating the set of constraints comprises updating one or more limits of a constraint of the set of constraints based on a current value of a process variable associated with the constraint; and
  optimizing, with an optimizing and controlling engine of the one or more processors, the continuous digester operation by using the soft measurements, one or more physical measurements, and the dynamically updated set of constraints to compute a plurality of set points within the set of constraints for maintaining an optimal digester level and an optimal blow consistency for stable production rate and for minimizing use of alkali to maintain a pre-defined pulp quality.

8. The method of claim 7, further comprising displaying, with an operator display module of the one or more processors, one or more of the continuous digester operation, the plurality of set points, the set of constraints, the soft measurements, the non-linear empirical model, the transformed process variables, and the plurality of process variables.

9. The method of claim 7, further comprising providing an operator interface for receiving operator inputs.

10. The method of claim 7, wherein the one or more quality variables comprise at least one of a Kappa number, residual alkali, a bottom dilution factor, and a chip level in the continuous digester.

* * * * *